(12) United States Patent
Delamour et al.

(10) Patent No.: US 9,645,411 B2
(45) Date of Patent: May 9, 2017

(54) TELESCOPIC HINGE FOR SPECTACLES FRAME (71) Applicants: Dominique Delamour, Les Mesnuls (FR); Olivier Rodi, Gambais (FR); Alain Miklitarian, Paris (FR); Richard Chene, Neuilly (FR)

(72) Inventors: Dominique Delamour, Les Mesnuls (FR); Olivier Rodi, Gambais (FR); Alain Miklitarian, Paris (FR); Richard Chene, Neuilly (FR)

(73) Assignees: Dominique Delamour, Les Mesnuls (FR); Alain Miklitarian, Paris (FR); Richard Chene, Neuilly (FR)

( * ) Notice: Subject to any disclaimer, the term of this patent is extended or adjusted under 35 U.S.C. 154(b) by 0 days.

(21) Appl. No.: 14/385,959

(22) PCT Filed: Mar. 19, 2013

(86) PCT No.: PCT/EP2013/055741
§ 371 (c)(1),
(2) Date: Sep. 17, 2014

(87) PCT Pub. No.: WO2013/139817
PCT Pub. Date: Sep. 26, 2013

(65) Prior Publication Data
US 2015/0049299 A1 Feb. 19, 2015

(30) Foreign Application Priority Data
Mar. 21, 2012 (FR) .................................... 12 52551

(51) Int. Cl.
G02C 5/00 (2006.01)
G02C 5/20 (2006.01)
G02C 5/22 (2006.01)

(52) U.S. Cl.
CPC ............. *G02C 5/22* (2013.01); *G02C 5/2236* (2013.01); *G02C 2200/26* (2013.01); *G02C 2200/30* (2013.01)

(58) Field of Classification Search
CPC ... G02C 5/22; G02C 5/00; G02C 7/10; G02C 7/16; G02C 9/02; G02C 5/20;
(Continued)

(56) References Cited

U.S. PATENT DOCUMENTS 6,231,181 B1 * 5/2001 Swab ..................... G02C 5/146
16/228
2006/0050226 A1 3/2006 Chene et al.
(Continued)

FOREIGN PATENT DOCUMENTS

GB 2087094 5/1982

*Primary Examiner* — Bumsuk Won
*Assistant Examiner* — Henry Duong
(74) *Attorney, Agent, or Firm* — Duane Morris LLP; J. Rodman Steele, Jr.; Gregory M. Lefkowitz (57) ABSTRACT The telescopic hinge comprises a front face element intended to be joined with a side stud extending along the front face of the frame and having a first fastener, and a branch element, intended to be joined with the corresponding branch of the frame and having a second fastener capable of cooperating with the first fastener in order to hold the front face element against the branch element. The telescopic hinge also includes an intermediate fastener capable of cooperating respectively with the first fastener and the second fastener.

11 Claims, 5 Drawing Sheets

(58) Field of Classification Search
CPC .......... G02C 3/003; G02C 5/143; G02C 5/16; G02C 1/04; G02C 1/06; G02C 1/08; G02C 1/02; G02C 5/2263; G02C 5/146; G02C 5/2209
USPC ........................................................ 351/153
See application file for complete search history.

(56) References Cited

U.S. PATENT DOCUMENTS

| | | | |
|---|---|---|---|
| 2008/0094569 A1* | 4/2008 | Tabacchi .............. | G02C 5/2245 351/113 |
| 2008/0192199 A1* | 8/2008 | Hotellier .............. | G02C 5/2236 351/153 |
| 2009/0047061 A1* | 2/2009 | Chene .................. | B25J 17/0258 403/65 |
| 2014/0022503 A1* | 1/2014 | Kheang ................ | G02C 5/2218 351/153 |

* cited by examiner

Fig. 1

PRIOR ART

Fig. 2

PRIOR ART

TELESCOPIC HINGE FOR SPECTACLES FRAME

CROSS-REFERENCE TO RELATED APPLICATIONS

This application is a §371 national stage entry of International Application No. PCT/EP2013/055741, filed Mar. 19, 2013, which claims priority to French Patent Application No. 1252551, filed Mar. 21, 2012, the entire contents of which are incorporated herein by reference.

The field of the invention is that of spectacle frames.

A spectacle frame generally comprises a front face extended by two lateral lugs, and two temples, which are articulated to the lugs about the pivot axes of two hinges. Each hinge comprises a front face element, which is rigidly connected to a lateral lug, and a temple element, which is rigidly connected to the corresponding temple, these two elements being articulated to the pivot axis of said hinge.

The pivot axes of the hinges are substantially parallel to the front face. Thus, by rotating about the pivot axis of the corresponding hinge, each temple can successively assume two positions relative to the lateral lug with which it is associated. In a first position, known as the open position, the temple is an extension of the lug and extends substantially at a right angle from the general plane of the front face, thereby allowing the frame to be worn. In a second position, known as the closed position, the temple is substantially parallel to the front face and flattened against said front face, thereby reducing the volume of the spectacle frame.

In order for the temple to be openable beyond the right angle corresponding to its open position, each hinge may be telescopic. Such an "over-opening" of the temple thus ensures greater comfort when the frame is placed onto the nose and, additionally, prevents any risk of breakage or deformation of the frame and temples.

Generally speaking, such a telescopic hinge comprises a slider that is fitted, on the one hand, to the pivot axis of the hinge and, on the other hand, in a sleeve that is rigidly connected to the corresponding temple (or to a core on which the temple is formed). This slider is capable of sliding into the sleeve against and under the effect of a spring, which is generally a compression spring, which also extends into said sleeve. This spring thus makes it possible to flatten the temple against the wearer's face, while also precisely allowing for an over-opening of the hinge.

In order to fasten together the front face element and the temple element of such a telescopic hinge, it is already known to equip both the temple element (more specifically the end of the slider located on the front face element side) and the front face element with fasteners which are capable of cooperating with each other. These fasteners may be in the form of hooks or eyelets arranged in a perpendicular manner relative to each other, or more generally in any form capable of rotating about the pivot axis of the hinge.

However, since the first fastener of this type of known hinge is located on the lateral lug side, a frame that is equipped in this manner has the drawback of occupying much space in the closed position, and of having a very noticeable lug, despite this lug being the most visible portion of the frame where a brand logo is generally located.

Moreover, since the second fastener of such a hinge is directly connected to the compression spring, removal of said hinge proves particularly difficult and carries the considerable risk of the spring getting lost in the process.

The object of the present invention is to facilitate the removal and possible refitting of a telescopic hinge as described above, while at the same time helping to make the lateral lug, to which said hinge is rigidly connected, occupy a satisfactory amount of space and to be satisfactorily unobtrusive.

To this end, according to the invention, the telescopic hinge for a spectacle frame, comprising a front face element which is intended to be rigidly connected to a lateral lug that is an extension of the front face of the frame and provided with a first fastener, and a temple element which is intended to be rigidly connected to the corresponding temple of said frame and provided with a second fastener capable of cooperating with the first fastener in order to hold the front face element against the temple element, is remarkable in that it further comprises an intermediate fastener capable of cooperating with both said first fastener and said second fastener.

Thus, owing to the present invention, the hinge can be easily removed (or refitted) by withdrawing the intermediate fastener, this for example being withdrawn first from the first fastener (of the front face element), then from the second fastener (of the temple element). In this manner, the stress acting on the spring is limited during the separation of the temple element and the front face temple element, and this ensures easy removal (or refitting) of the hinge.

Furthermore, the flexibility of design offered by the intermediate fastener makes it possible to provide a first fastener that is not necessarily in the form of a hook or an eyelet, and this therefore makes it possible to limit the space occupied by the lateral lug to which the hinge is intended to be rigidly connected, and to help make said lug less noticeable.

In the present application the applicants are using the term "hinge" usually employed to denote the devices connecting a temple to the front face of a spectacle frame. Clearly, if any kind of limitation ever had to be associated with this term, it is the term "articulation" that would need to replace the term "hinge" for a perfect understanding of the invention.

In order to pivot the temple about the lateral lug so that said temple reaches an over-open position, the temple element can be provided with a slider which is articulated to the front face element and fitted so as to slide against and under the effect of a spring.

If the intermediate fastener is provided with at least one hole, the second fastener, according to a particular embodiment thereof, is in the form of a hook capable of insertion into said hole.

Still in the case of the intermediate fastener being provided with at least one hole and in order to limit the space occupied by the lateral lug, the first fastener may comprise a hole capable of being in superposition with the hole in said intermediate fastener and of being held against said intermediate fastener under the effect of a holding element.

Advantageously, the holding element and the hole in the intermediate fastener are respectively threaded and tapped at least in part so as to be able to cooperate with each other by screwing, thereby preventing any sliding of the fastener along the hole in the intermediate fastener and therefore holding the first and second fasteners against each other more firmly by means of said intermediate fastener.

Preferably, the threaded portion of the holding element is configured so as to be capable of introduction into the hole in the intermediate fastener in a non-perpendicular manner to said hole. Since the introduction of the holding element is thus offset, the means performing the telescopic function of the hinge—for example a spring against and under the effect of which a slider, which is articulated to the front face element, is slidingly fitted—can be prestressed.

According to a preferred embodiment, the intermediate fastener is provided with two holes capable of cooperating with the first fastener and the second fastener respectively.

For easy insertion of the fastener that is first inserted into a hole in the intermediate fastener, the holes in the intermediate fastener may be contiguous and in communication.

The intermediate fastener according to the present invention is advantageously in the form of one piece provided with two ring portions which define the holes, thereby facilitating its production and its handling during removal and refitting of the telescopic hinge.

The invention also relates to a spectacle frame comprising a front face extended by two lateral lugs and two temples articulated to the lateral lugs about pivot axes of two hinges, which is remarkable in that at least one of the two hinges is a telescopic hinge according to any of the above-described embodiments.

The figures of the accompanying drawings will clearly illustrate how to carry out the invention. In these figures, identical reference numerals denote similar technical elements.

Figure 1:
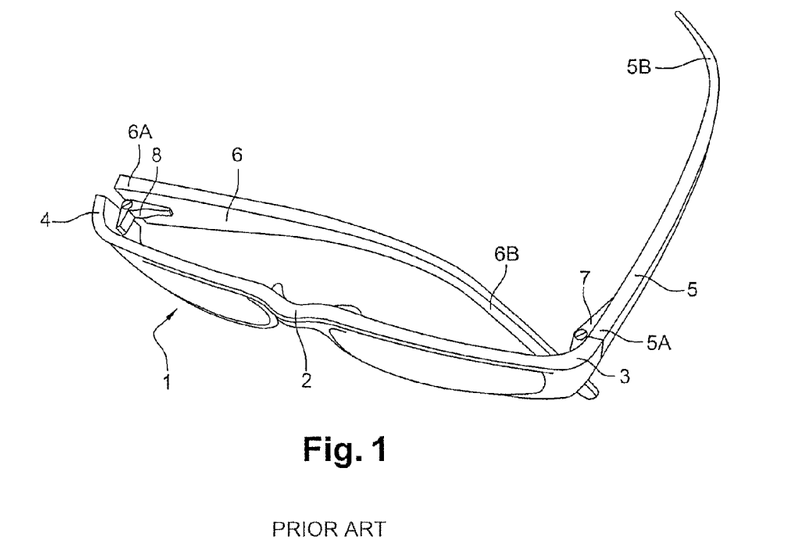
FIG. 1 is a perspective view of a spectacle frame according to the prior art.

The spectacle frame 1, which is shown schematically in FIG. 1, is an example of a conventional prior art configuration and comprises a front face 2 for receiving generally optical lenses which is laterally extended, on either side, by a left lateral lug 3 and a right lateral lug 4. The frame 1 also comprises a left temple 5, which is articulated to the left lateral lug 3 about the pivot axis of a left hinge 7, and a right temple 6, which is articulated to the right lateral lug 4 about the pivot axis of a right hinge 8.

The left temple 5 has two ends: a free rear end 5B, shaped to fit the wearer's face, and a front articulation end 5A, at which said left temple 5 is intended to be articulated to the lug 3. The right temple 6 likewise comprises two ends: a free rear end 6B, shaped to fit the wearer's face, as a complement to the rear end 5B of the left temple 5, and a front articulation end 6A, at which said right temple 6 is intended to be articulated to the lug 4.

The left hinge 7 and the right hinge 8 are telescopic hinges of similar form and composition. Thus, in the following, only the left hinge 7 will be described.

The pivot axis of the left hinge 7 is substantially perpendicular to the left lateral lug 3 and to the left temple 5. In this manner, by rotating about the pivot axis of the telescopic hinge 7, the temple 5 can assume, on the one hand, an open position, in which it is an extension of the lateral lug 3 associated therewith and extends substantially at a right angle from the general plane of the front face 2, or, on the other hand, a closed position, in which it is substantially parallel to the front face 2 and flattened against said face. In the sample frame shown in FIG. 1, the left temple 5 is in the open position, whereas the right temple 6 is in the closed position. When the two temples are in the open position, the frame 1 is set up to be worn by surrounding the head of its wearer. When the two temples are in the closed position, the frame 1 is more compact.

Figure 2:
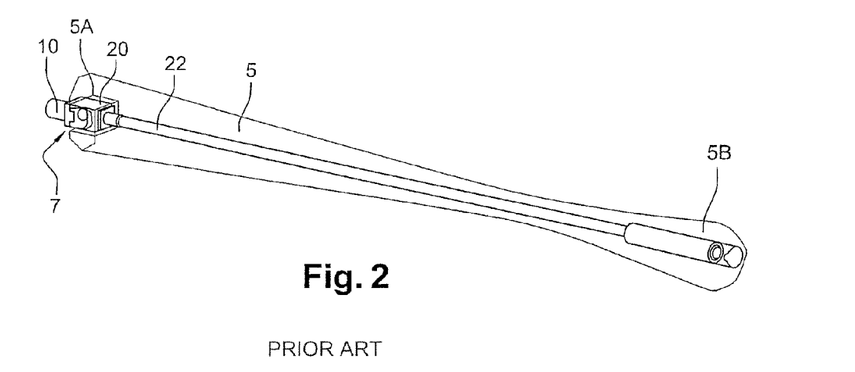
FIG. 2 is a perspective view of a temple and of a telescopic hinge of the spectacle frame in FIG. 1.

FIG. 2 shows the left hinge 7 in greater detail, connected to the left temple 5. The hinge 7 comprises a front face element 10 which is intended to be rigidly connected to the right lateral lug, and a temple element 20 which is rigidly connected to the right temple 5. Thus, the right hinge 7 allows for coupling of the right lateral lug to the front end 5A of the right temple 5.

In order for the hinge 7 to perform a telescopic function, the temple element 20 is equipped with a slider which is slidingly fitted in a sleeve 22. This slider 23 (which is shown in greater detail in FIG. 3, in which the sleeve 22 in FIG. 2 is not shown) is articulated to the front face element 10 about a pivot axis (not shown). The slider 23 is capable of moving inside the sleeve 22 against and under the effect of a spring 24 arranged on the side of the end 5A of the temple 5. This compression spring 24 allows the temple 5 to be flattened against the lateral lug 3 while allowing said temple 5 to be at a certain distance so as to be movable away from the general plane of the front face 2 by an angle greater than 90°.

According to another embodiment, the spring 24 is arranged at the end 5B of the temple 5, known as the free end, in an enlarged portion of the sleeve 22, thus allowing this spring 24 to be moved away and, therefore, the weight of the hinge 7 to be better distributed over the entire temple 5 for improved comfort for the wearer of the frame 1, as taught by document FR 1002908, for example.

In all cases, starting from the open position of the temple 5, the slider 23 can be urged into the sleeve 22 in the direction of the free end 5B of the temple 5 towards the hinge 7. As it is moved, the slider 23 thus brings about compression of the spring 24, allowing the temple to be oriented in one direction or in the other direction relative to the angle of the temple 5 corresponding to its open position. At rest, with the temple either closed or open, the spring 24 is released once the slider 22 has slid in the other direction under the effect of said spring 24.

Owing to this configuration, the hinge 7 can assume, in addition to the open and closed positions described above, a position known as an "over-open" position, in which the temple 5 extends, relative to the general plane of the front face 2, at an angle that substantially exceeds a right angle (the angle which corresponds to the open position).

Figure 3:
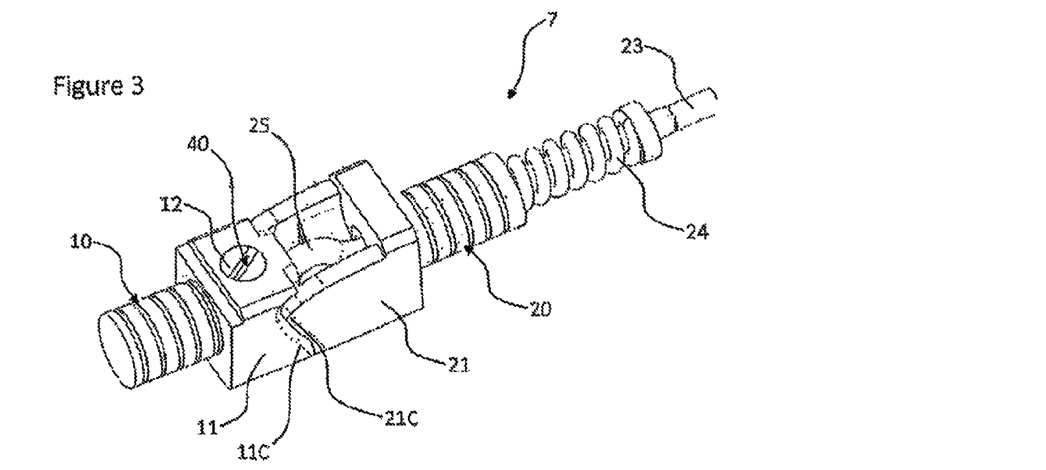
FIG. 3 is a perspective view of a telescopic hinge according to a particular embodiment of the invention.

According to the present invention, the front face element 10 comprises one piece 11 in which a hole 12 is made from the top, said hole cooperating with a holding element 40 to act as a first fastener.

In addition, the temple element 20 comprises a hook 25 (which forms, for example, the extension of the slider 23) which by itself acts as a second fastener, which is capable of cooperating with the aforesaid first fastener by means of an intermediate fastener 30.

It will further be noted that this temple element 20 comprises one piece 21 of which the end 21C, located on the front face element 10 side, has a complementary shape to the end 110 of the piece 11 located on the temple element 20 side.

Figure 6:
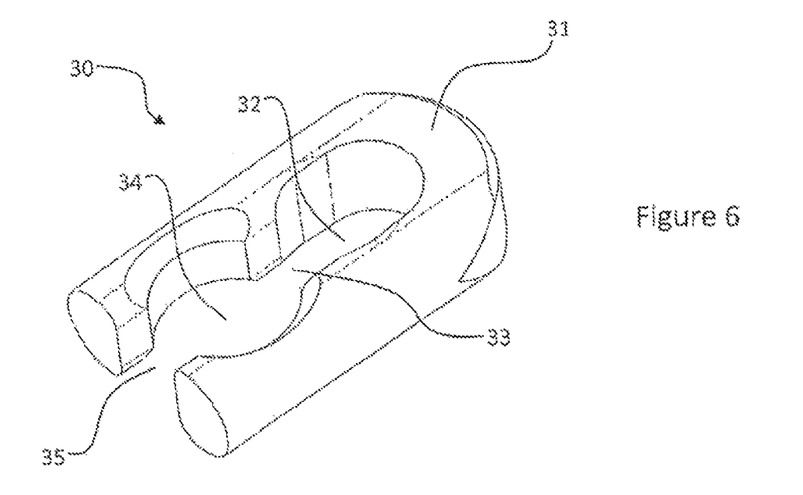
FIG. 6 is a perspective view of an intermediate fastener according to a particular embodiment of the invention.
Figure 7:
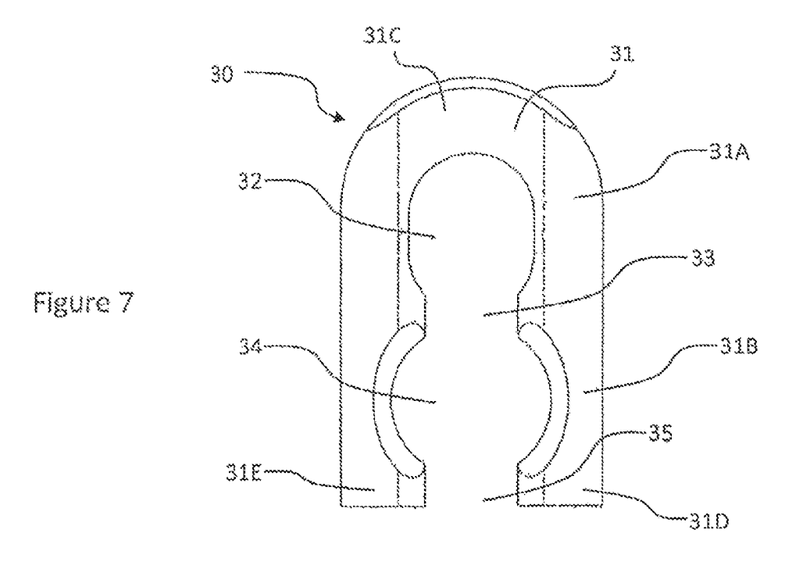
FIG. 7 is a profile of the intermediate fastener in FIG. 6.

The intermediate fastener 30 is shown in greater detail in FIGS. 6 and 7. It is formed in just one piece 31 and is generally horse-shoe shaped. This piece 31 comprises a first ring portion 31A, which defines a first hole 32, and a second ring portion 31B, which is the definition of a second hole 34. The ring portions 31A and 31B are arranged such that, on the one hand, the holes 32 and 34 are contiguous and in communication by means of a first opening 33 and, on the other hand, the second hole 34 is opened outwardly, by means of a second opening 35.

As regards the holding element 40, this is in the form of a pin of suitable length and diameter for insertion into both the hole 12 in the front face element 10 and the second hole 34 in the intermediate fastener 30.

Figure 8:
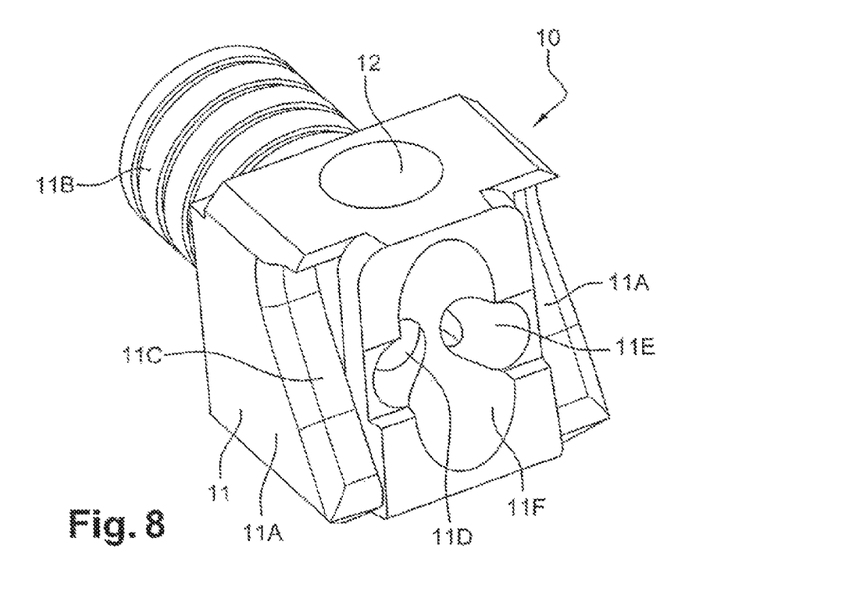
FIG. 8 is a perspective view of a front face element provided with a first fastener according to the invention.
Figure 9:
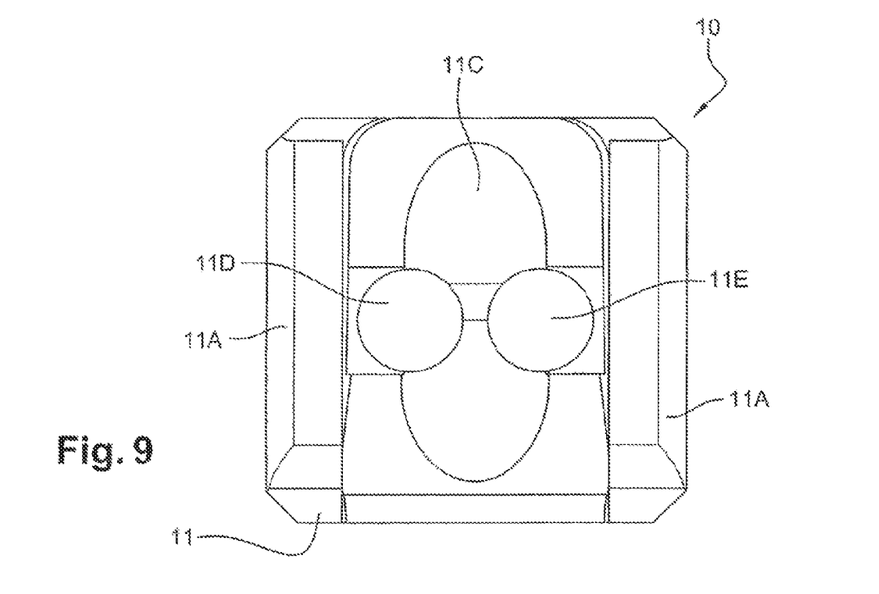
FIG. 9 is a profile of the front face element in FIG. 8.

Moreover, the piece 11 of the front face element 10, which piece is shown in greater detail in FIGS. 8 and 9, comprises a first portion 11A, where the first fastener is arranged, and a second portion 11B, located on the lateral lug 3 side. In a direction substantially orthogonal to the axis of the hole 12, the piece 11 is provided with two holes 11D and 11E, for the passage of the two branches 31D and 31E of the intermediate fastener 30, and with a cavity 11F in which the end of the hook 25 can be arranged when the front face element 10 and temple element 20 are brought together.

Figure 4:
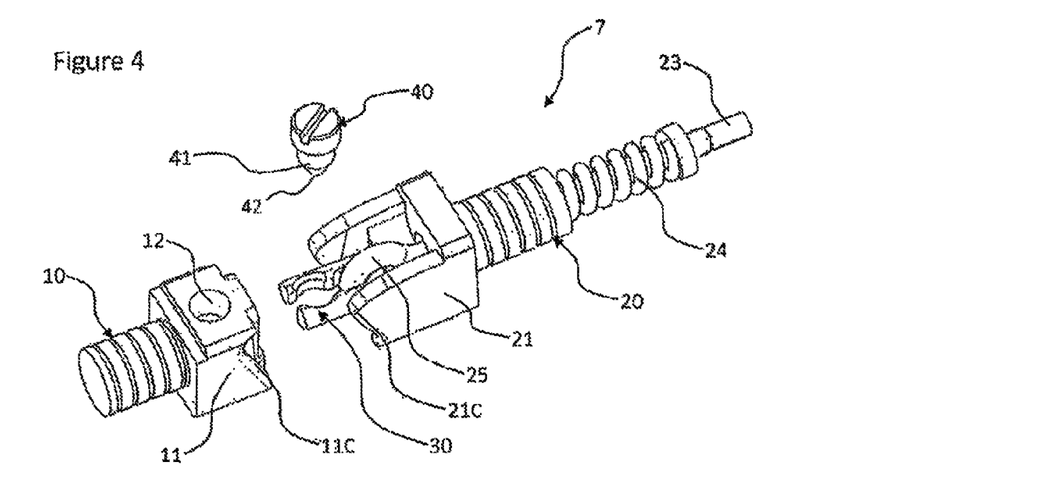
FIG. 4 is an exploded perspective view of the telescopic hinge in FIG. 3.
Figure 5:
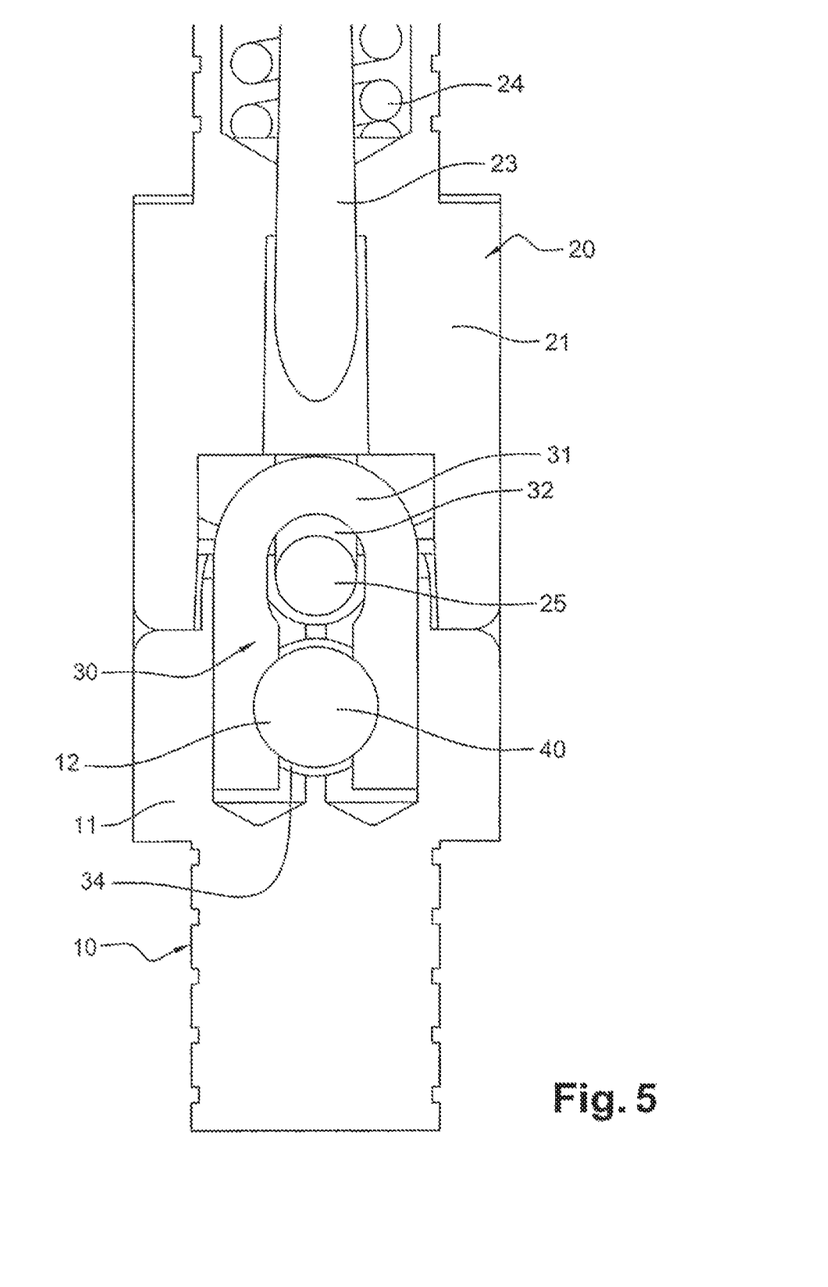
FIG. 5 is a longitudinal section of the telescopic hinge in FIG. 3.

As can be seen in FIG. 4, the hook 25 can be easily inserted into the first hole 32 in the intermediate fastener 30, passing successively through the second opening 35, the second hole 32 and the first opening 33. The hook is then locked in this hole 32 on account of the closed end 31C of the piece 31.

Thereafter, the portion of the intermediate fastener 30 that does not cooperate with the hook 25 can be inserted, at the two branches 31D and 31E, inside the two holes 11D and 11E in the front face element 10, said hook 25 thus reaching the cavity 11F. In this position, the second hole 34 in the intermediate fastener 30 is superposed on the hole 12 in the first fastener of the front face element.

Since the front face element 10 and the temple element 20 thus bear on each other, in order to be fastened to each other, the holding element 40 can be inserted, first through the hole 12 and then through the second hole 34. In this position, the holding element 40 thus maintains the relative position between the intermediate fastener 30 and the first fastener (formed by the hole 12 and the holding element 40).

Thus, the intermediate fastener 30 is held, on the one hand, against the first fastener (the hole 12 and the holding element 40) and, on the other hand, against the second fastener (the hook 25). It follows that, owing to its two holes which are capable of cooperating with the first fastener and the second fastener respectively, the intermediate fastener 30 makes it possible to hold the front face element 10 against the temple element 20.

Moreover, if the above-described procedure for fitting the telescopic hinge 7 proves particularly easy, in particular on account of the addition of the intermediate fastener 30 as an intermediate piece limiting the stress acting on the spring 24, removal of said hinge is evidently just as simple. In fact, to remove this telescopic hinge 7, the holding element 40 simply needs to be withdrawn from the hole 12, then the intermediate fastener 30 from the holes 11D and 11E, then said intermediate fastener 30 from the hook 25 where, here too, the stress acting on the spring 24 is limited.

It will be noted that the pin forming the holding element 40 may be threaded, whereas the hole 34 in the intermediate fastener 30 may be tapped in a complementary manner, so that they can cooperate with each other by screwing, offering the advantage of locking their relative positions. In this case, the threaded portion of the pin 40, located at the body 41 of said pin, may be configured for introduction into said second hole 34 in the intermediate fastener 30 in a non-perpendicular manner to this hole 34, allowing the spring 24 to be prestressed as soon as the telescopic hinge 7 is fitted.

In all cases, since the holding element 40 has to be screwed into the second hole 34, said holding element 40 is in fact locked by said second hole 34 itself. The only way of withdrawing this means 40 is to voluntarily use a screwdriver to unscrew said means, the screwing effort having to exceed the pressure exerted by the second hole 34 on the body 41 of the pin 40 so as to loosen said second hole 34.

It will also be noted that the body 41 of the pin, which is substantially cylindrical, may terminate in a cone 42. In addition, the body 41 of the pin 40 may, more specifically, be in the shape of an inverted conical cylinder, meaning that the diameter of the base is larger than the diameter at the opposite end, which is in contact with the threaded portion. Thus, when the pin 40 is screwed in fully, the second hole 34 comes into contact with the base 42 of said pin 40 and, owing to the conical nature of the body 41, exerts a counter-thrust relative to the movement seeking to unscrew said pin 40. It will therefore be understood that there is no need, in this case, to screw the pin 40 in fully since once the second hole 34 is in place, there is no longer any risk of losing the holding element 40 (the pin). It will be seen that the shape of the body 41 as an inverted conical cylinder is not necessarily mandatory.

It will also be noted that the edges of the second hole 34 in the intermediate fastener 30 can be machined at an incline, so that the body 41 of the pin 40 can enter into said hole 34 by urging said intermediate fastener 30 towards the bottom of its housing in the front face element 10, thus stretching, here too, the spring 24 of the temple-side articulation.

The intermediate fastening horse-shoe shape 30 in FIGS. 6 and 7 has two holes 32 and 34, which are open, that is to say, not closed off from each other. A horse-shoe shape having such closed holes for receiving the hook 25 and the pin 40 would be feasible. Such an embodiment is very easy to produce and very effective. In this case it will be noted that threading would no longer be formed on the head of the pin 40 but on the portion adjacent to the head of the body 41, at the top of the cone (when there is one).

The invention claimed is:

1. Telescopic hinge for a spectacle frame, comprising a front face element which is rigidly connected to a lateral lug that is an extension of the front face of the frame and provided with a first fastener, and a temple element which is rigidly connected to the corresponding temple of the frame and provided with a second fastener capable of cooperating with the first fastener in order to hold the front face element against the temple element, wherein said telescopic hinge further comprises an intermediate fastener such that the second fastener is capable of cooperating with the first fastener via the intermediate fastener, wherein the intermediate fastener being provided with at least one hole, the first fastener comprises a hole capable of being in superposition with the hole in said intermediate fastener and of being held against said hole under the effect of a holding element, wherein the front face element comprising a first opening and a second opening positioned proximate to the first opening, each of the first and second openings extends through at least a portion of the front face, the intermediate fastener comprising a first branch and a second branch, wherein the first branch is configured to be positioned within the first opening of the front face and the second branch is configured to be positioned within the second opening of the front face.

2. Telescopic hinge according to claim 1, wherein the temple element is provided with a slider which is articulated to the front face element and fitted so as to slide against and under the effect of a spring.

3. Telescopic hinge according to claim 1, wherein, since the intermediate fastener is provided with at least one other hole, the second fastener is in the shape of a hook capable of insertion into said other hole.

4. Telescopic hinge according to claim 1, wherein the holding element and the hole in the intermediate fastener are respectively threaded and tapped at least in part so as to be able to cooperate with each other by screwing.

5. Telescopic hinge according to claim 4, wherein the threaded portion of the holding element is configured so as to be capable of introduction into the hole in the intermediate fastener in a non-perpendicular manner to said hole.

6. Telescopic hinge according to claim 1, wherein the intermediate fastener is provided with two holes capable of cooperating with the first fastener and the second fastener respectively.

7. Telescopic hinge according to claim 6, wherein the holes in the intermediate fastener are contiguous and in communication.

8. Telescopic hinge according to claim 6, wherein the intermediate fastener is one piece provided with two ring portions which define the holes.

9. Telescopic hinge according to claim 6, wherein the intermediate fastener comprises a closed end.

10. Spectacle frame comprising a front face extended by two lateral lugs and two temples articulated to the lateral lugs about pivot axes of two hinges, wherein at least one of the two hinges is a telescopic hinge according to claim 1.

11. Telescopic hinge according to claim 1, wherein said intermediate fastener is removable so as to facilitate the removal and refitting of said telescopic hinge.

* * * * *